(12) United States Patent
Ide

(10) Patent No.: US 11,957,979 B2
(45) Date of Patent: Apr. 16, 2024

(54) VIDEOGAME SKILL COST INCREASE

(71) Applicant: GREE, Inc., Tokyo (JP)

(72) Inventor: Hikaru Ide, Tokyo (JP)

(73) Assignee: GREE, INC., Tokyo (JP)

( * ) Notice: Subject to any disclaimer, the term of this patent is extended or adjusted under 35 U.S.C. 154(b) by 17 days.

(21) Appl. No.: 17/705,629

(22) Filed: Mar. 28, 2022

(65) Prior Publication Data

US 2022/0314122 A1 Oct. 6, 2022

(30) Foreign Application Priority Data

Mar. 31, 2021 (JP) .................. 2021-060363

(51) Int. Cl.
| A63F 13/58 | (2014.01) |
| A63F 13/2145 | (2014.01) |
| A63F 13/422 | (2014.01) |
| A63F 13/69 | (2014.01) |
| A63F 13/822 | (2014.01) |

(52) U.S. Cl.
CPC .......... *A63F 13/58* (2014.09); *A63F 13/2145* (2014.09); *A63F 13/422* (2014.09); *A63F 13/69* (2014.09); *A63F 13/822* (2014.09)

(58) Field of Classification Search
None
See application file for complete search history.

(56) References Cited

U.S. PATENT DOCUMENTS

| 10,576,372 B2 | 3/2020 | Franzas et al. |
| 2015/0105147 A1* | 4/2015 | Franzas ................. A63F 13/833 463/31 |

FOREIGN PATENT DOCUMENTS

| JP | 201573897 A | 4/2015 |
| JP | 201667905 A | 5/2016 |
| JP | 2020103787 A | 7/2020 |

OTHER PUBLICATIONS

Kog'Maw (League of Legends) via Wayback Machine, https://web.archive.org/web/20210306151109/https://leagueoflegends.fandom.com/wiki/Kog'Maw/LoL, Mar. 6, 2021 (Year: 2021).*
Gangplank (League of Legends) via Wayback Machine, https://web.archive.org/web/20210303125139/https://leagueoflegends.fandom.com/wiki/Gangplank/LoL, 3/6/201 (Year: 2021).*
Office Action dated Oct. 25, 2022 in corresponding Japanese Patent Application No. 2021-060363; 4 pages.
Office Action issued on Jan. 9, 2024, in corresponding Japanese Application No. 2023-054796; 7 pages.

* cited by examiner

*Primary Examiner* — Damon J Pierce
(74) *Attorney, Agent, or Firm* — Maier & Maier, PLLC

(57) ABSTRACT

A game control program for controlling a game in which a cost is set for each of a plurality of skills, the program allowing a computer to function as: a skill activation unit activating a first skill of the plurality of skills in response to a fact that an activation instruction of the first skill of which the set cost is less than or equal to a point that is used in skill activation and associated with a player is received from the player; a point subtraction unit subtracting a point corresponding to the cost that is set for the first skill from the point in response to the activation of the first skill; and a cost increase unit increasing the cost that is set for the first skill in response to the activation of the first skill.

15 Claims, 10 Drawing Sheets

FIG.5

| CHARACTER ID | CHARACTER NAME | POSSESSED SKILL | | HP | | OFFENSIVE STRENGTH | ... | DECK | VANGUARD/ REARGUARD |
|---|---|---|---|---|---|---|---|---|---|
| | | | | MAXIMUM VALUE | CURRENT VALUE | | | | |
| C1 | CHARACTER C1 | SKILL K11 | SKILL K12 | 100 | 100 | 50 | | 1 | 1 |
| C2 | CHARACTER C2 | SKILL K21 | SKILL K22 | 200 | 50 | 40 | | 1 | 0 |
| C3 | CHARACTER C3 | SKILL K31 | SKILL K32 | 300 | 25 | 30 | | 0 | — |
| ... | | | | | | | | | |

FIG.6

| SKILL ID | SKILL NAME | COST | | | | EFFECT |
|---|---|---|---|---|---|---|
| | | INITIAL VALUE | UPPER LIMIT VALUE | INCREASE VALUE | CURRENT VALUE | |
| K11 | SKILL K11 | 10 | 100 | 30 | 10 | DECREASE HP OF ENEMY CHARACTER BY 20 |
| K12 | SKILL K12 | 20 | 100 | 30 | 20 | INCREASE HP OF PLAYER CHARACTER BY 30 |
| K13 | SKILL K13 | 30 | 100 | 30 | 30 | DECREASE COST OF SKILL |
| ... | | | | | | |

FIG.9

| SKILL ID | SKILL NAME | COST | | | | EFFECT |
|---|---|---|---|---|---|---|
| | | INITIAL VALUE | UPPER LIMIT VALUE | INCREASE VALUE | CURRENT VALUE | |
| K11 | SKILL K11 | 10 | 100 | 30 | 40 | DECREASE HP OF ENEMY CHARACTER BY 20 |
| K12 | SKILL K12 | 20 | 100 | 30 | 20 | INCREASE HP OF PLAYER CHARACTER BY 30 |
| K13 | SKILL K13 | 30 | 100 | 30 | 30 | DECREASE COST OF SKILL |
| ... | | | | | | |

VIDEOGAME SKILL COST INCREASE

TECHNICAL FIELD

The present disclosure relates to a game control program, a game control method, and a game control system.

SUMMARY

A game control program, a game control method, and a game control system are provided in which a game with high amusement can be provided.

According to one aspect, a game control program for controlling a game in which a cost is set for each of a plurality of skills, the program allowing a computer to function as: a skill activation unit activating a first skill of the plurality of skills in response to a fact that an activation instruction of the first skill of which the set cost is less than or equal to a point to be used in skill activation is received from a player; a point subtraction unit subtracting a point corresponding to the cost set for the first skill from the point in response to the activation of the first skill; and a cost increase unit increasing the cost set for the first skill in response to the activation of the first skill, is provided.

The game control program may allow the computer to further function as: a cost decrease unit decreasing the cost set for the first skill.

The cost decrease unit may decrease the cost set for the first skill up to an initial value of the cost of the first skill.

The cost decrease unit may decrease the cost set for the first skill by a predetermined value.

The game may include a competition with an enemy game content, and the cost decrease unit may decrease the cost set for the first skill in accordance with start or end of the competition with the enemy game content.

A second skill of the plurality of skills may have an effect of decreasing a cost of a skill of which the cost is increased, and the cost decrease unit may decrease the cost set for the first skill in accordance with a fact that the second skill is activated.

The game may include a competition with an enemy game content, the game control program may allow the computer to further function as: a game content control unit setting a part of a plurality of player game contents possessed by the player to be competitive with the enemy game content and the other part to be uncompetitive with the enemy game content in accordance with a manipulation of the player, and the cost decrease unit may decrease the cost set for the first skill in accordance with a fact that the player game content that is set to be competitive and activates the first skill is set to be uncompetitive during the competition with the enemy game content.

The game may be a turn-based game, and the cost decrease unit may decrease the cost set for the first skill in accordance with a predetermined number of turns and a fact that the first skill is not activated.

An increase value of a cost to be increased by the cost increase unit in response to one skill activation may be common to all of the plurality of skills.

An increase value of a cost to be increased by the cost increase unit in response to one skill activation may be different between the first skill and a third skill of the plurality of skills.

An upper limit value that is common to all of the plurality of skills may be set for the cost, and the cost increase unit may increase the cost only up to the upper limit value.

An upper limit value may be set for the cost, an upper limit value of the cost set for the first skill may be different from an upper limit value of a cost set for a fourth skill of the plurality of skills, and the cost increase unit may increase the cost only up to the upper limit value set for each of the costs. Note that, the fourth skill may be identical to or different from the second skill/the third skill.

The game control program may allow the computer to further function as: a point addition unit adding the point, in which the upper limit value of the cost may be a maximum value or less of the point.

The game control program may allow the computer to further function as: a point addition unit adding the point; and a game content distribution unit distributing a plurality of point increase game contents, in which the point addition unit may add the point in accordance with the number of point increase game contents selected by the player among the point increase game contents.

In the game, a competition between the player game content and the enemy game content may be performed on the basis of a turn, the game control program may allow the computer to further function as: a game content control unit setting two or more of the player game contents possessed by the player to be competitive with the enemy game content, any of the player game contents set to be competitive with the enemy game content may be set for each of the plurality of point increase game contents, and only when the player game contents set for two or more of the plurality of distributed point increase game contents are common, the two or more point increase game contents may be selected.

In addition, according to another aspect, a game control method for controlling a game in which a cost is set for each of a plurality of skills, the method including: allowing a skill activation unit to activate a first skill of the plurality of skills in response to a fact that an activation instruction of the first skill of which the set cost is less than or equal to a point to be used in skill activation is received from a player; allowing a point subtraction unit to subtract a point corresponding to the cost set for the first skill from the point in response to the activation of the first skill; and allowing a cost increase unit to increase the cost set for the first skill in response to the activation of the first skill, is provided.

In addition, according to another aspect, a game control system for controlling a game in which a cost is set for each of a plurality of skills, the system including: a skill activation unit activating a first skill of the plurality of skills in response to a fact that an activation instruction of the first skill of which the set cost is less than or equal to a point to be used in skill activation is received from a player; a point subtraction unit subtracting a point corresponding to the cost set for the first skill from the point in response to the activation of the first skill; and a cost increase unit increasing the cost set for the first skill in response to the activation of the first skill, is provided.

The amusement of a game is improved.

BRIEF DESCRIPTION OF THE DRAWINGS

FIG. 5 is a diagram illustrating information of a player character to be stored in a storage unit 3;

FIG. 6 is a diagram illustrating information of a skill to be stored in the storage unit 3;

FIG. 9 is a diagram illustrating the information of the skill to be stored in the storage unit 3 (a state in which a cost is increased)

DETAILED DESCRIPTION

Hereinafter, embodiments according to the present invention will be described in detail with reference to the drawings. First, an example of a game to which one embodiment of the invention can be applied will be described.

This game can be executed on an arbitrary game terminal (computer) such as a mobile terminal such as a smart phone or a tablet, and a dedicated game machine. In a case where the game is executed on the mobile terminal, the game may be executed through a web browser, or the game may be executed by installing a predetermined game program in the mobile terminal (a so-called native application). In a case where the game is executed by the dedicated game machine, the game may be executed by the dedicated game machine reading out a game cartridge in which a predetermined game program is written.

In this game, a player (user) possesses one or more characters. The character may be applied when the game starts, may be available by charging, or may be applied in a case where a predetermined condition is satisfied during the game progress.

The player is capable of configuring a deck by selecting an arbitrary character from the characters that the player possesses. There may be an upper limit in the number of characters incorporated in the deck. The player arbitrarily selects a predetermined number of (hereinafter, five) characters from the characters that the player possesses to configure a unit. Here, in a case where the general number of characters that the player possesses is less than 5, the unit is configured from the characters of less than 5.

Note that, any character may be incorporated in the deck, but may not be incorporated in the unit in accordance with the type thereof. Specifically, the general character (hereinafter, when simply referred to as a "character", the character indicates the general character) can be incorporated in the unit, but a "spirit character" may not be included in the unit.

Further, the player sets three characters of the five characters in the vanguard, and sets two characters in the rearguard. Hereinafter, in order to distinguish the character that the player possesses from an enemy character that appears in a competition game, the character that the player possesses will be referred to as a "player character". In addition, the player characters set in the vanguard and the rearguard will be referred to as a "vanguard character" and a "rearguard character", respectively.

A competition between the player character and one or a plurality of enemy characters is performed at a predetermined timing during the game progress. The competition is a turn-based competition, and a turn in which the player character acts in accordance with the manipulation of the player and a turn in which the enemy character acts are alternately repeated. Note that, the action of the enemy character may be in accordance with the manipulation of the other player, or may be automatically performed in the game.

Figure 1:
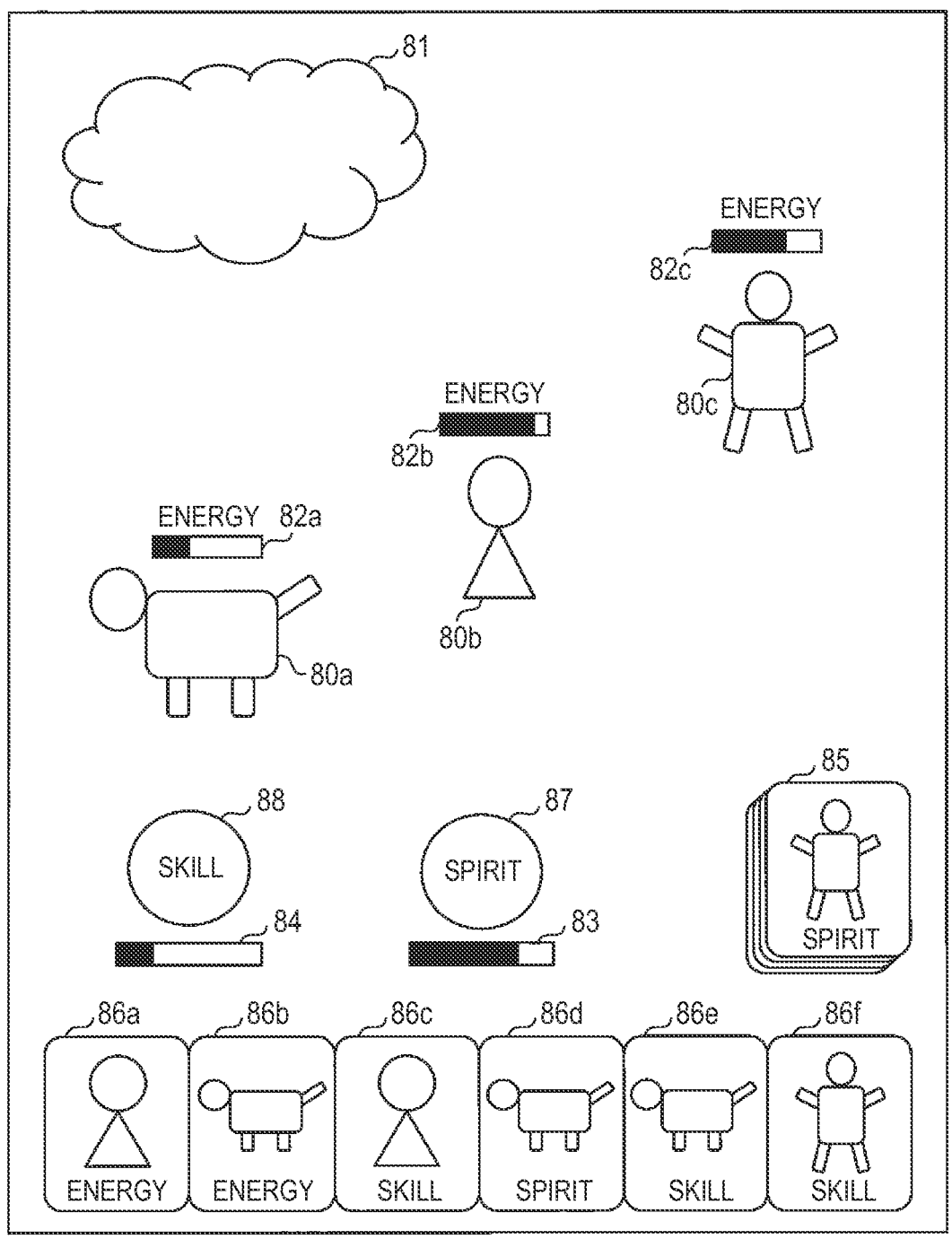
FIG. 1 is a diagram schematically illustrating an example of a competition screen to be displayed on a display of a game terminal when a turn starts.

FIG. 1 is a diagram schematically illustrating an example of a competition screen which, in certain exemplary embodiments, the server and/or the terminal may cause to be displayed on a display of the game terminal when the turn starts. The server and/or the terminal may cause the competition screen to display three vanguard characters 80a to 80c, and one enemy character 81, and a competition therebetween may then be performed. Note that, in the contemplated exemplary embodiment, two rearguard characters do not participate in the competition, and do not attack the enemy character 81 or are not attacked by the enemy character 81. Therefore, the rearguard characters may not be displayed on the competition screen.

Then, in this game, three types of points of an "energy point", a "spirit point", and a "skill point" can be used.

The energy point is a point to be set for each of the three vanguard characters 80a to 80c. It can also be said that the energy point is a point for activating a killer technique described below. The energy point is a parameter that varies during the competition, and the current value thereof is represented by energy gauges 82a to 82c that are associated with the vanguard characters 80a to 80c, respectively.

The spirit point and the skill point are a point to be set for the three vanguard characters 80a to 80c in common (accordingly, it is considered that the spirit point and the skill point are set for the player). It can also be said that the spirit point is a point for activating a spirit skill described below. It can also be said that the skill point is a point for activating a skill described below (different from the spirit point). The spirit point and the skill point are also a parameter that varies during the competition, and the current value thereof is represented by a spirit gauge 83 and a skill gauge 84, respectively.

A maximum value is set for such points, and corresponds to the right end of each of the gauges 82 to 84. When the competition starts, the point remaining in the previous competition may be taken over, but in this game, the point is initialized to a predetermined value (for example, ½ of the maximum value). This is because it is possible to suppress an underhanded play in which the player competes with a weak enemy character to increase the point, ends the competition, and in such a state, attempts to compete with a strong enemy character. In each turn on the player side, the following processing is performed.

When the turn starts, a plurality of (hereinafter, six) cards 86a to 86f are distributed to a player card from a bundle 85 of a plurality of virtual cards (hereinafter, simply referred to as a "card") prepared in advance in a stock. Among the six cards 86a to 86f to be distributed to the player card, one card is a card that is seen at the top of the card bundle 85, and the other five cards are randomly selected.

The character and the type of point are set for each of the cards 86a to 86f. Specifically, any of the vanguard characters 80a to 80c is set as the character for each of the cards 86a to 86f. In addition, any of "energy", "spirit", and a "skill" is set as the type for each of the cards 86a to 86f. Each of the cards 86a to 86f is displayed in a specific color according to the type.

For example, in FIG. 1, the vanguard character 80b and the "energy" are set for the card 86a. In addition, the vanguard character 80a and the "energy" are set for the card 86b.

In addition to the cards for which any of the "energy", the "spirit", and the "skill" is set, a "killer technique" for which any of the "energy", a card for which the "spirit", and the "skill" is set is set (hereinafter, referred to as a "killer technique card") may be distributed to the player card. The killer technique card is a special card associated with any of the vanguard characters 80a to 80c, and for example, is displayed in an iridescent color.

The player selects any of the distributed cards 86a to 86c, but before the selection, the vanguard characters 80a to 80c and the rearguard characters can be switched. Specifically, one or more of the vanguard characters 80a to 80c can be changed to be in the rearguard, and the same number of rearguard characters can be changed to be in the vanguard, in accordance with the manipulation of the player. In a case where any of the vanguard characters 80a to 80c is changed, among the cards 86a to 86f distributed to the player card, the cards 86a to 86f for which the player character that is no longer in the vanguard is set are changed to a card for which any vanguard character including the player character that is newly set in the vanguard is set.

For example, in FIG. 1, in a case where the vanguard character 80c is changed to be in the rearguard, and another player character 80d (not illustrated) is set in the vanguard, at least the card 86f is changed. For the card after the change, any of the vanguard characters 80a, 80b, and 80d is set.

Then, the player selects one or a plurality of cards among six cards 86a to 86f distributed to the player card. Here, only in a case where the characters or the types set for two or more of six cards 86a to 86f are common, the two or more cards can be selected (here, the killer technique card functions as a wild card and can be selected along with the other arbitrary cards 86a to 86f). In a case where there are a plurality of cards of which the set characters or types are common, among the six cards 86a to 86f, the plurality of cards can be intuitively selected, and the exhilarating experience can be simply obtained.

For example, in FIG. 1, the player may select two cards 86a and 86c as two or more cards of which the set characters are common, or may select three cards 86b, 86d, and 86e. Alternatively, the player may select two cards 86a and 86b as two or more cards of which the set types are common, or may select three cards 86c, 86e, and 86f.

Then, the point increases in accordance with the type set for the selected card and the number of selected cards. In this respect, it can also be said that the card is a point increase card.

Specifically, in a case where a card for which the "energy" is set (hereinafter, referred to as an "energy card") is selected, the energy point of the vanguard character set for the energy card increases. For example, in a case where the energy card 86a in FIG. 1 is selected, the energy point of the vanguard character 80b increases, which is reflected on the energy gauge 82b. As an example, the maximum value of the energy point is 100, and in a case where one energy card is selected, the energy point increases to 10 points. The energy point may increase in proportion to the number of selected energy cards, or an increase point may increase as the number of selected energy cards increases. In a case where the energy point of a certain vanguard character reaches a predetermined value (for example, the maximum value), the killer technique card associated with the vanguard character is distributed to the player card in the next turn.

In a case where a card for which the "spirit" is set (hereinafter, referred to as a "spirit card", for example, the card 86d in FIG. 1) is selected, the spirit point increases, which is reflected on the spirit gauge 83. As an example, the maximum value of the spirit point is 100, and in a case where one spirit card is selected, the spirit point increases to 10 points. The energy point may increase in proportion to the number of selected spirit cards, or an increase point may increase as the number of selected cards increases. In a case where the spirit point reaches a predetermined value, the skill of the spirit character which is incorporated in the deck that the player possesses but not included in the unit can be activated (described below).

In a case where a card for which the "skill" is set (hereinafter, referred to as a "skill card", for example, the cards 86c, 86e, and 86f in FIG. 1) is selected, the skill point increases, which is reflected on the skill gauge 84. As an example, the maximum value of the skill point is 100, and in a case where one skill card is selected, the skill point increases to 10 points. The skill point may increase in proportion to the number of selected skill cards, or an increase point may increase as the number of selected skill cards increases. In a case where the skill point reaches a predetermined value, the skill can be activated (described below).

Note that, in a case where the energy card is selected, the spirit point and/or the skill point may increase in addition to the energy point. In such a case, an increase value of the spirit point and/or the skill point is smaller than an increase value of the energy point. The same applies to the spirit card and the skill card.

In a case where the selection of the card by the player is completed, the player character set for the selected card attacks the enemy character 81. For example, in FIG. 1, in a case where the cards 86a and 86c are selected, the vanguard character 80b attacks. In addition, in a case where the cards 86a and 86b are selected, the vanguard characters 80b and 80a attack. Specifically, a hit point of the enemy character 81 is reduced in accordance with the offensive strength of the vanguard character that attacks and the defensive strength of the enemy character 81.

In addition, in a case where the killer technique card is included in the selected card 86, the killer technique possessed by the vanguard character associated with the killer technique card is activated. In a case where the killer technique is activated, the energy point is reduced by a predetermined point or up to the predetermined value (for example, the minimum value).

There may be various killer techniques. For example, there is a killer technique for greatly reducing the hit point of the enemy character 81. It can also be said that the killer technique increases or decreases a certain parameter (for example, the offensive strength, the defensive strength, and the hit point) by a specific value for a specific turn with respect to a certain target (for example, one player character, all of the player characters, one enemy character, and all of the enemy characters) at a certain event probability (may be 100%).

In addition, in a case where the spirit point reaches the predetermined value (for example, the maximum value) by selecting the card, the player is capable of selecting a spirit skill activation button 87. Effect display indicating that the spirit point reaches the predetermined value (that is, the spirit skill activation button 87 can be selected) may be performed. In a case where the spirit skill activation button 87 is selected by the user, the spirit skill possessed by the spirit character (not illustrated in FIG. 1) that is included in the deck is activated. In a case where the spirit skill is activated, the spirit point is reduced by the predetermined point or up to the predetermined value (for example, the minimum value). The reduced spirit point is reflected on the spirit gauge 83.

There may be various spirit skills. For example, there is a spirit skill for decreasing a cost for activating the skill described below. It can be also said that the spirit skill increases or decreases a certain parameter (for example, the offensive strength, the defensive strength, and the hit point) by a specific value for a specific turn with respect to a certain target (for example, one player character, all of the player characters, one enemy character, and all of the enemy characters) at a certain event probability (may be 100%).

Each of the spirit characters possesses the spirit skill according to the spirit character. Accordingly, in a case where the player possesses a plurality of spirit characters, it is necessary for the player to consider which spirit character to be incorporated in the deck in consideration of the compatibility with the player character incorporated in the unit or the enemy character for competition, and thus, the amusement of the game is improved.

In addition, in a case where the skill point is accumulated by selecting the card, the player is capable of activating the skill. The skill is associated with each of the characters, and for example, one character possesses two skills. In addition, a cost is set for each of the skills. The cost is a skill point required for activation. That is, in a case where the skill point is greater than or equal to the cost of a certain skill, the skill can be activated.

Specifically, the skill is activated as described below. The player selects a skill activation button 88 on the competition screen. Following this, according to an exemplary embodiment, the server and/or the terminal may cause a skill selection screen exemplified in FIG. 2 to be displayed. On this screen, a list of skills that are possessed by any of the vanguard characters 80a to 80c and can be activated (that is, skills of which the cost is the skill point or less) are displayed to be selectable. On the skill selection screen, the cost of each of the skills may be displayed, and the effect of each of the skills may be further displayed.

Figure 2:
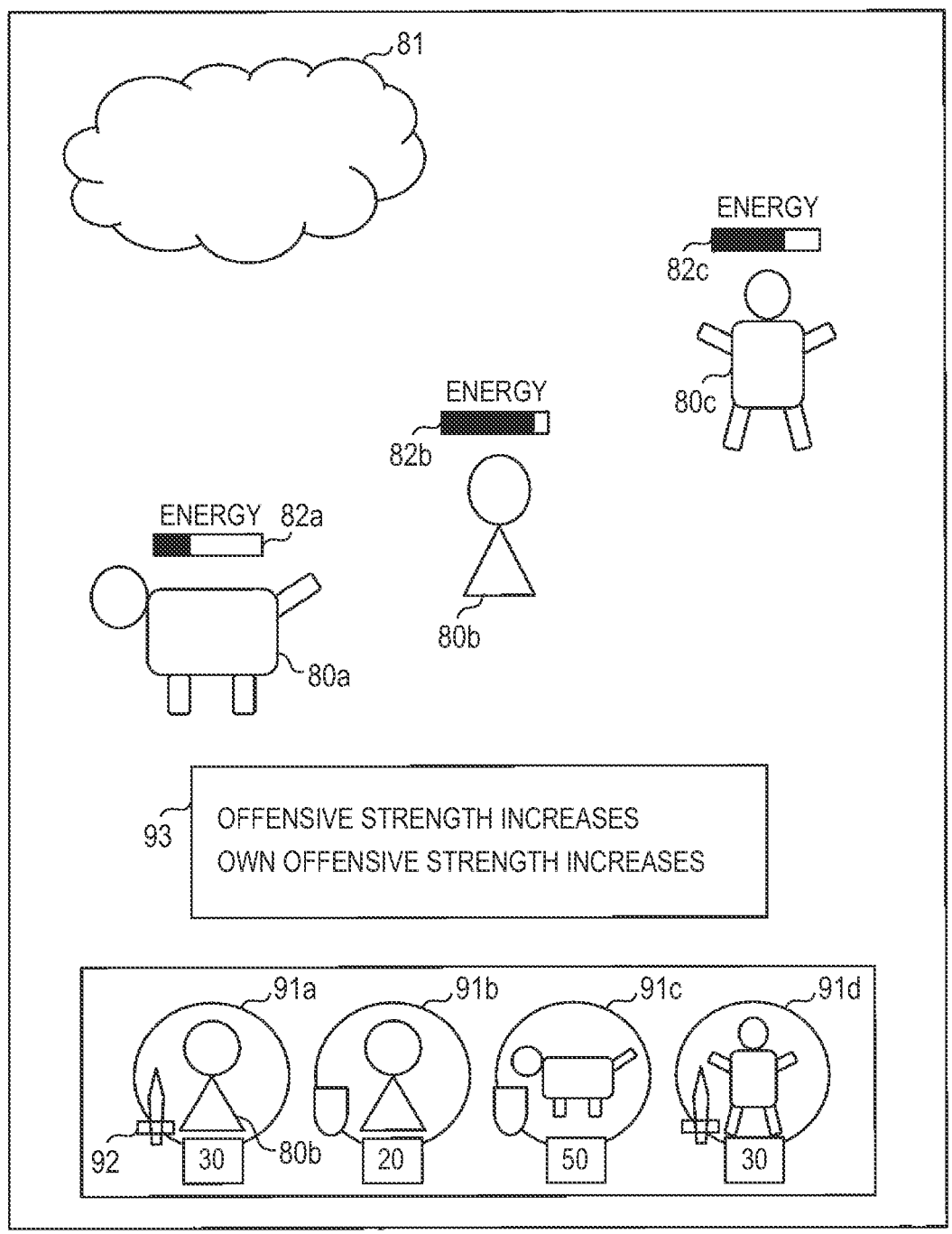
FIG. 2 is a diagram schematically illustrating an example of a skill selection screen.

For example, on the screen of FIG. 2, skill selection buttons 91a to 91d for selecting the skill are displayed. The character 80b is associated with the skill selection button 91a, which indicates that the skill can be activated by the character 80b. In addition, a cost "30" for activating the skill is associated with the skill selection button 91a. Further, a mark 92 shaped like a sword which indicates that the skill increases the offensive strength is associated with the skill selection button 91a. In a case where the skill selection button 91a is temporarily selected, the description of the skill to be activated when the skill selection button 91a is selected is displayed in a skill description section 93. The same applies to the other skill selection buttons 91b to 91d.

Then, in a case where the player selects any of the skill selection buttons 91a to 91d to select the skill, the selected skill is activated, and a predetermined effect is exhibited. In a case where the skill is activated, the skill point is reduced only by the cost set for the activated skill. The reduced skill point is reflected on the skill gauge 84.

There may be various skills. For example, there are a skill for reducing the hit point of the enemy character 81, a skill for increasing the energy point of the other vanguard character, and the like. It can also be said that the skill increases or decreases a certain parameter (for example, the offensive strength, the defensive strength, and the hit point) by a specific value for a specific turn with respect to a certain target (for example, one player character, all of the player characters, one enemy character, and all of the enemy characters) at a certain event probability (may be 100%).

Specific examples of the killer technique, the spirit skill, and the skill described above include "increasing the offensive strength by 10% for three turns with respect to one player character (a character activating the killer technique or the like) at an event probability of 80% when activating the skill (the required cost is 10)", "decreasing the defensive strength by 50 for one turn with respect to all of the enemy characters at an event probability of 100% when a battle appears (the required cost is 30)", and the like.

Here, as one of the features of this game, the cost is not constant but is capable of varying. That is, in a case where the skill is activated in a certain turn on the player character side, a cost for activating the same skill in the subsequent turn on the player character side increases. For example, in a case where a skill of which the cost is 30 is activated in a certain turn, the cost is 40 points the next turn. It is desirable that the increase value (the number of increase points) of the cost is common to all of the skills. This is because it is easy for the player to understand.

In a case where the skill is activated in a certain turn, the cost increases, and in a case where the same skill is also activated in the next turn, the cost further increases. Here, the cost does not increase without any limitation, but there is an upper limit value in the cost. The upper limit value can be less than or equal to the maximum value of the skill point.

It is desirable to display a performance screen indicating that the cost of the skill increases, for example, during the performance of the skill activation, such that the player recognizes an increase in the cost of the skill. In such a performance or on a screen to be displayed after the performance, the increase in the cost may be represented by a numerical value, or may be represented by a color according to the increase point of the cost.

Figure 3:
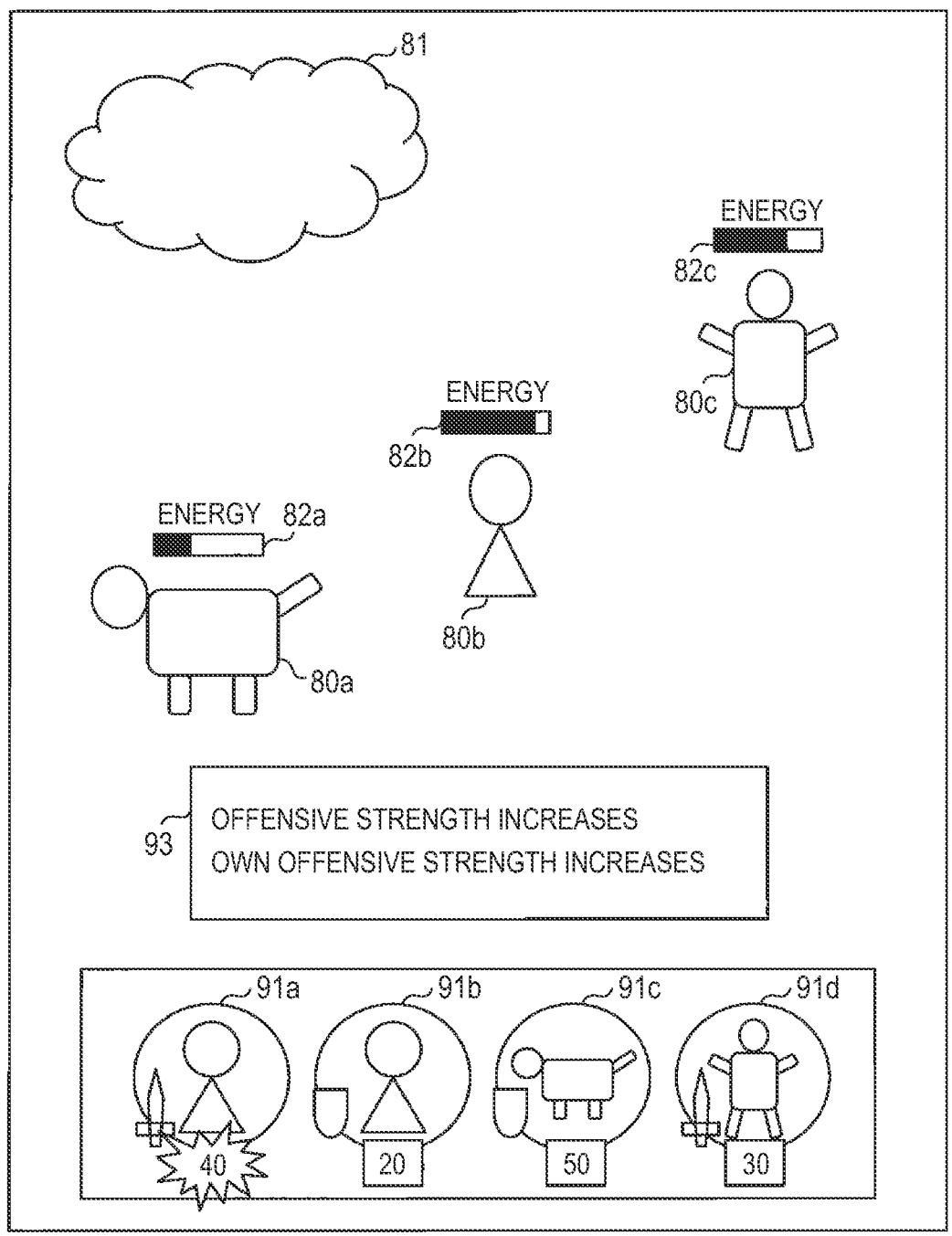
FIG. 3 is a diagram schematically illustrating an example of a screen indicating a cost of a skill is increased.

As an example, in FIG. 2, in a case where the skill activation button 91a of which the cost is 30 is selected, as illustrated in FIG. 3, the server and/or the terminal may control the display to display that the cost associated with the skill activation button 91a increases to "40".

As described above, the turn on the player character side ends. A turn on the enemy character side starts as the turn on the player character side ends. In the turn on the enemy character side, an action for reducing the hit point of the player character can be performed.

In a case where such a turn is repeated, and the hit points of all of the enemy characters 81 are 0, the competition ends as a victory on the player side. On the other hand, in a case where the hit point of any of the vanguard characters 80a to 80c is 0, any of the rearguard characters is automatically set to the vanguard character, and the competition is continuously performed. Then, in a case where the hit points of all of the player characters included in the unit are 0, the competition ends as a defeat on the player side. In a case where the competition ends, the cost of the skill is reset to the initial value.

In such a game, in a case where the cost of the skill is a constant value, the player uses only an efficient skill (specifically, a skill of which the cost is low and the effect is large), and thus, only the player character that possesses such a skill is used as the vanguard. Accordingly, the game tends to be monotonous.

In contrast, in this game, in a case where a certain skill is activated, the cost of the skill increases, and the efficiency decreases (specifically, the cost increases, but the effect is not changed). Therefore, the player is motivated to use the other skill in the next turn. As a result thereof, the player selects various skills, and thus, the player uses various player characters.

As described above, the player uses not only a specific player character and a specific skill but also a number of player characters and a number of skills by increasing the cost of the activated skill, and thus, the amusement of the game is improved. In addition, in a case where there are not sufficient skills to be selectable, the player desires a new player character that possesses another skill. By distributing such a player character to the player for profit, a game creator is capable of ensuring a profit.

A terminal device 100 that is capable of attaining such a game will be described.

Figure 4:
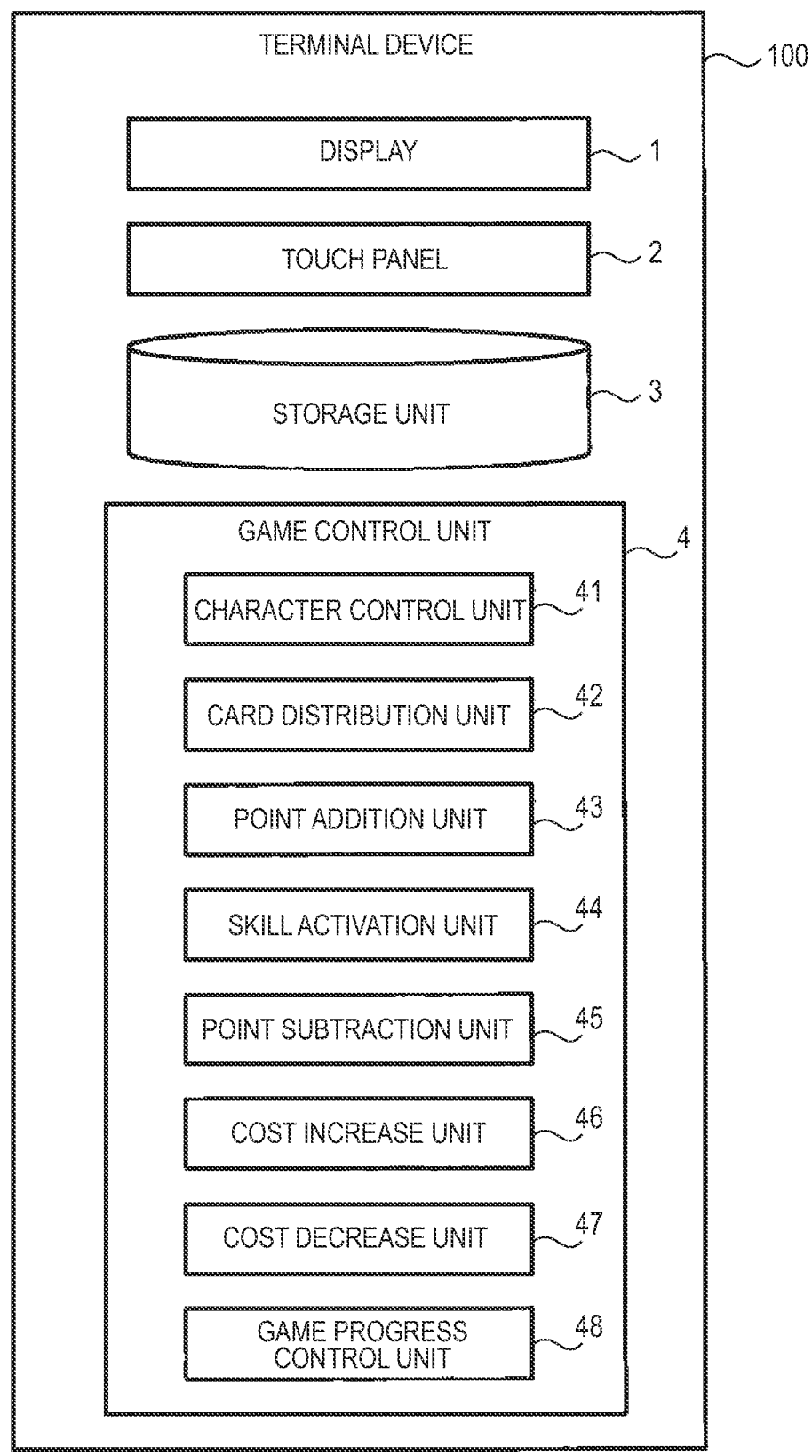
FIG. 4 is a block diagram illustrating an outline configuration of a terminal device 100 controlling a game according to one embodiment.

FIG. 4 is a block diagram illustrating the outline configuration of the terminal device 100 controlling a game according to one embodiment. Unless otherwise noted, the terminal device 100 (a user terminal) is a smart phone.

The terminal device 100 includes a display 1 and a touch panel 2, which may have a predetermined positional relation defined between the display 1 and the touch panel 2, for example whereby the display 1 and the touch panel 2 overlap with each other. Accordingly, for example, in a case where the terminal device 100 displays, or a server controls the terminal device 100 to display, a selectable icon in a predetermined position of the display 1 and the corresponding position in the touch panel 2 is touched, the terminal device 100 is capable of grasping that the icon is selected.

Hereinafter, the manipulation of the player is a touch manipulation by a finger or a touch pen with respect to the touch panel 2. Here, (in particular, in a case where the terminal device 100 is not a smart phone), the manipulation may be replaced with a manipulation using the other input interfaces such as a button, an arrow key, a mouse, a keyboard, and a microphone.

The terminal device 100 includes a storage unit 3. The storage unit 3 includes a RAM, a ROM, and the like, and stores various information items, various data items, various programs, and the like. Hereinafter, the storage unit will be described in detail.

FIG. 5 is a diagram illustrating the information of the player character to be stored in the storage unit 3. As illustrated, for a character ID for specifying the character, the character name, the skill that the character possesses, a state parameter such as the hit point (HP), a capacity parameter such as the offensive strength, information indicating whether or not the character is incorporated in the unit and indicating in which of the vanguard and the rearguard the character is set when the character is incorporated, and the like are stored in association with each other.

The skill that the character possesses is a skill that can be activated by the character. In FIG. 5, an example is illustrated in which each character possesses two skills, the number of skills that the character possesses is not particularly limited, and the number of skills that the character possesses may be different for each of the characters. In addition, the skill may be intrinsic to the character, or a certain skill may be possessed by a plurality of characters.

The state parameter is a parameter that is capable of varying during the competition, and the maximum value and the current value are stored. The hit point that is one of the state parameters indicates the physical strength of the player character, and in a case where the value is a predetermined value (for example, 0), the competition is not available, and the player character is not capable of continuously being as a vanguard player (the attack or the skill activation is not capable of being performed with respect to the enemy character). The capacity parameter may be a fixed value that does not vary during the competition, or may vary in accordance with some skills or the like. In the latter case, the maximum value and the current value are also stored.

In addition, in the example of FIG. 5, "1" is associated with the character that is incorporated in the unit, and "0" is associated with the character that is not incorporated in the unit. In addition, "1" is associated with the character that is incorporated in the unit and set in the vanguard, and "0" is associated with the character that is set in the rearguard.

FIG. 6 is a diagram illustrating the information of the skill to be stored in the storage unit 3. As illustrated, for a skill ID for specifying the skill, the skill name, the cost, and the effect are stored in association with each other. The cost includes the initial value, the upper limit value, the increase value, and the current value. This will be described below. The effect, for example, is capable of allowing the parameter (the state parameter or the capacity parameter) of the player character or the enemy character to vary. As a specific example, the hit point of the enemy character is decreased, the offensive strength of the player character is increased, or the defensive strength of the enemy character is decreased. The variation of the parameter may be a constant value, or may be a random value in a predetermined range.

Note that, the effect may not be necessarily intrinsic to the skill ID. For example, the effect may be set by arbitrarily or randomly selecting at least one of a target, an event probability, a parameter, the number of turns, and an increase value or a decrease value to be associated with a certain skill ID.

In addition, the current value, the maximum value, and the like of one or more types of points relevant to the game progress are stored in the storage unit 3. One of the points is the skill point for activating the skill, and there may be the other types of points (the energy point, the spirit point, and the like described above).

Returning to FIG. 4, the terminal device 100 includes a game control unit 4. The game control unit 4 includes a character control unit 41, a card distribution unit 42, a point addition unit 43, a skill activation unit 44, a point subtraction unit 45, a cost increase unit 46, a cost decrease unit 47, and a game progress control unit 48. According to an exemplary embodiment, a part or all of the units may be attained by a processor (not illustrated) of the terminal device 100 executing a game program stored in the storage unit 3. Alternatively, at least a part of the units may be the function of an operating system (OS) of the terminal device 100, or may be implemented by hardware. For example, according to an exemplary embodiment, the game control unit 4 may be configured as a circuit (a game control circuit) that includes one or more processors that operate according to a computer program, one or more dedicated hardware circuits that perform at least some of the various processes, or a combination thereof. (Likewise, this may be the case for the units included in the game control unit 4, which may for example be implemented as a character control circuit, a card distribution circuit, a point addition circuit, a skill activation circuit, and so forth.) It may be contemplated for the one or more processors which may implement the game control unit 4 to include an arithmetic processing unit such as a CPU, MPU, or GPU, and a storage medium such as RAM or ROM. It likewise may be contemplated for the game control unit 4 to include a memory or storage medium, which may, for example, be an HDD, SSD, or the like. At least one of these storage media may be configured to store instructions, such as program code, configured to cause the CPU to perform processing. The storage medium, or computer readable medium, may be contemplated to include any available medium that can be accessed by a general purpose or dedicated computer.

The character control unit 41 configures the deck from the player characters selected in accordance with the manipulation of the player, before the competition starts. In addition, the character control unit 41 configures the unit from the player characters selected in accordance with the manipulation of the player, before the competition starts. Further, the character control unit 41 sets a part of the player characters configuring the unit in the vanguard and sets the other part in the rearguard, in accordance with the manipulation of the player. It can be said that the vanguard is a state in which the player character is capable of competing with the enemy character, and the rearguard is a state in which the player character is not capable of competing with the enemy character.

In addition, the character control unit 41 switches the vanguard character to the rearguard character, or switches the rearguard character to the vanguard character, during the competition. Such switching may be performed in accordance with the manipulation of the player, or may be automatically performed in a case where a predetermined condition is satisfied (for example, in a case where the hit point of the vanguard character is 0, the player character is set in the rearguard, and any of the rearguard characters of which the hit point is not 0 is set in the vanguard).

As a specific example of the processing, the character control unit 41 stores the information indicating whether or not the player character is included in the unit and whether the player character included in the unit is in the vanguard or in the rearguard in the storage unit 3 in association with each of the player characters (refer to FIG. 5).

The card distribution unit 42 distributes one or more cards. The distributed card can be selected by the player. In a case where a predetermined rule is satisfied, the player is capable of selecting a plurality of cards. As the predetermined rule, for example, the characters or the types set for the card are common. In a case where the card distribution unit 42 distributes a plurality of cards, the same card may be redundantly distributed, or all of the cards to be distributed may be different from each other. In addition, a part or all of the cards to be distributed may be random, or may be set in advance. In the latter case, the player may know or assume the cards to be distributed. As a specific example of the processing, the card distribution unit 42 controls the display 1 to display such that the card is distributed.

The point addition unit 43 adds the skill point associated with the player. The addition timing is arbitrary, and for example, may be a timing when the player selects a specific card, or may be the other timing. In addition, the point addition unit 43 may add the skill point only at the timing when the specific card is selected, or may add the skill point at the other timing. The other timing, for example, indicates a timing when the turn starts, a timing when the specific skill is activated, a timing when the vanguard character attacks the enemy character, a timing when the vanguard character is attacked by the enemy character, and the like.

As a specific example of the processing, the point addition unit 43 reads out the current value of the skill point stored in the storage unit 3, and stores a value after the addition as a new current value of the skill point in the storage unit 3.

In addition, the point addition unit 43 may display the skill point after the addition on the display 1 by a gauge or the like.

Note that, here, the "addition" ("adding") includes not only an aspect in which the point addition unit 43 itself performs the addition but also an aspect in which the point addition unit 43 retrieves a result of the addition performed by the other device (for example, a server that is capable of communicating with the terminal device 100). That is, a "value obtained by performing the addition" includes not only a value obtained by the point addition unit 43 itself in the terminal device 100 performing the addition processing, but also a value obtained by the other device performing the addition processing. The same applies to "variation", "subtraction", "increase", "decrease", and the like described below.

In addition, in a case where there are other types of points in addition to the skill point, the point addition unit 43 also adds the other types of points. In addition, the point addition unit 43 may be omitted, and for example, a predetermined skill point may be applied when the competition starts such that the skill point does not increase during the competition.

The skill activation unit 44 receives an activation instruction of a skill of which the set cost is the skill point or less, among the plurality of skills, through the manipulation of the player, and thus, activates the skill. Accordingly, an effect associated with the activated skill is exhibited.

As a specific example of the processing, the skill activation unit 44 compares the current value of the skill point with the current value of the cost set for each of the skills, with reference to the storage unit 3. Then, the skill activation unit 44 displays the skill selection screen (that is, a screen for the player to select a skill in which the latter is the former or more) on the display 1. The skill selected by the player is associated with an effect of allowing a specific parameter to vary, the skill activation unit 44 reads out the current value of the specific parameter that is stored in the storage unit 3, and stores a value obtained by allowing the parameter to vary as a new current value in the storage unit 3. The skill activation unit 44 may display performance according to the activated skill on the display 1.

The point subtraction unit 45 subtracts the point. More specifically, the point subtraction unit 45 subtracts a skill point corresponding to the current value of the cost set for the activated skill from the current value of the skill point, in response to the activation of the skill. The point subtraction unit 45 may subtract the skill point only when the skill is activated, or may further subtract the skill point at the other arbitrary timing.

As a specific example of the processing, the point subtraction unit 45 reads out the current value of the skill point that is stored in the storage unit 3, and stores a value obtained by the subtraction as a new current value of the skill point in the storage unit 3. In addition, the point subtraction unit 45 may display the skill point after the subtraction on the display 1 by a gauge or the like.

The cost increase unit 46 increases the cost set for the skill. More specifically, the cost increase unit 46 increases the cost set for the skill in response to the activation of the skill. In addition, the cost increase unit 46 may increase the cost set for the skill only when the skill is activated, or may increase the cost at the other arbitrary timing. The other timing, for example, indicates a timing when the vanguard character is switched to the rearguard, a timing when a specific skill is activated by the enemy character, and the like.

The value of the cost to be increased (the increase value) may be common to all of the skills, may be different in accordance with the skill, or may be a random value. An upper limit value is set in the cost, and the cost increase unit 46 may increase the cost only up to the upper limit value. The upper limit value can be less than or equal to the maximum value of the point to be added. Both of the initial value and the upper limit value of the cost may be common to all of the skills, or may be different in accordance with the skill. For a part of the skills, the initial value and the upper limit value of the cost may be coincident with each other (that is, the cost does not increase).

As an example, in a case of giving priority to the understandability of the player, the initial value of the cost may be different in accordance with the skill, and the increase value and the upper limit value may be common to all of the skills (refer to FIG. 6).

As another example, the individuality of the skill may be guaranteed by making the initial value, the upper limit value, and the increase value of the cost different for each of the skills. For example, a skill in which the initial value of the cost is high and the upper limit value is low is less likely to be used in the initial turn, but is more likely to be used since the upper limit value is low even as the turn progresses. On the other hand, a skill in which the initial value of the cost is low and the upper limit value is high is more likely to be used in the initial turn, but is less likely to be used since the cost increases as the turn progresses.

In addition, a certain skill may be possessed by a plurality of player characters. The cost increase unit 46 may increase only a cost for the player character that activates a skill to activate the same skill, and may not increase a cost for the other player character to activate the same skill. In this case, setting the plurality of characters that possess the same skill in the vanguard can be one valid strategy.

Alternatively, the cost increase unit 46 may increase a cost for not only the player character that activates the skill but also the other player character to activate the same skill. In this case, setting characters that possess skills different from each other in the vanguard without setting the plurality of characters that possess the same skill in the vanguard can be one valid strategy.

Note that, the increase value may not be necessarily constant, and the increase value may vary in accordance with the current value. For example, the current value and the increase value may be identical to each other such that the cost is doubled every time when the skill is activated.

As a specific example of the processing, the cost increase unit 46 reads out the current value and the increase value of the cost of a cost increase target skill stored in the storage unit 3, and stores a value obtained by increasing the cost by adding the current value and the increase value as a new current value of the cost in the storage unit 3. More generally, the cost increase unit 46 may set a value obtained by performing predetermined calculation with respect to the current value of the cost of the cost increase target skill as the new current value of the cost. In addition, the cost increase unit 46 may display the cost after the increase on the display 1.

The cost decrease unit 47 decreases the cost. The cost decrease unit 47 may decrease the cost up to the initial value of the cost set for each of the skills, or may decrease the cost after the increase by a predetermined value. The predetermined value may be identical to the increase value, may be less than the increase value, may be greater than the increase value, may vary in accordance with the current value or the like, or may be a random value. A timing for decreasing the cost is arbitrary, and the cost decrease unit 47 may decrease the cost in accordance with some triggers.

For example, the cost decrease unit 47 may decrease the cost in accordance with the start or the end of the competition with the enemy character. Alternatively, the cost decrease unit 47 may decrease the cost in response to the fact that the skill for decreasing the cost is activated. In addition, the cost decrease unit 47 may decrease the cost in response to the fact that the vanguard character that activates the skill is set in the rearguard. In addition, the cost decrease unit 47 may decrease the cost of the skill in accordance with the predetermined number of turns, the fact that the same skill is not activated, and the like.

As a specific example of the processing, the cost decrease unit 47 reads out the current value of the cost of a cost decrease target skill stored in the storage unit 3, and stores a value obtained by decreasing the cost as a new current value of the cost in the storage unit 3. More generally, the cost decrease unit 47 may set a value obtained by performing predetermined calculation with respect to the current value of the cost of the cost decrease target skill as the new current value of the cost. In addition, the cost decrease unit 47 may display the cost after the decrease on the display 1.

The game progress control unit 48 controls the entire game progress.

Figure 7:
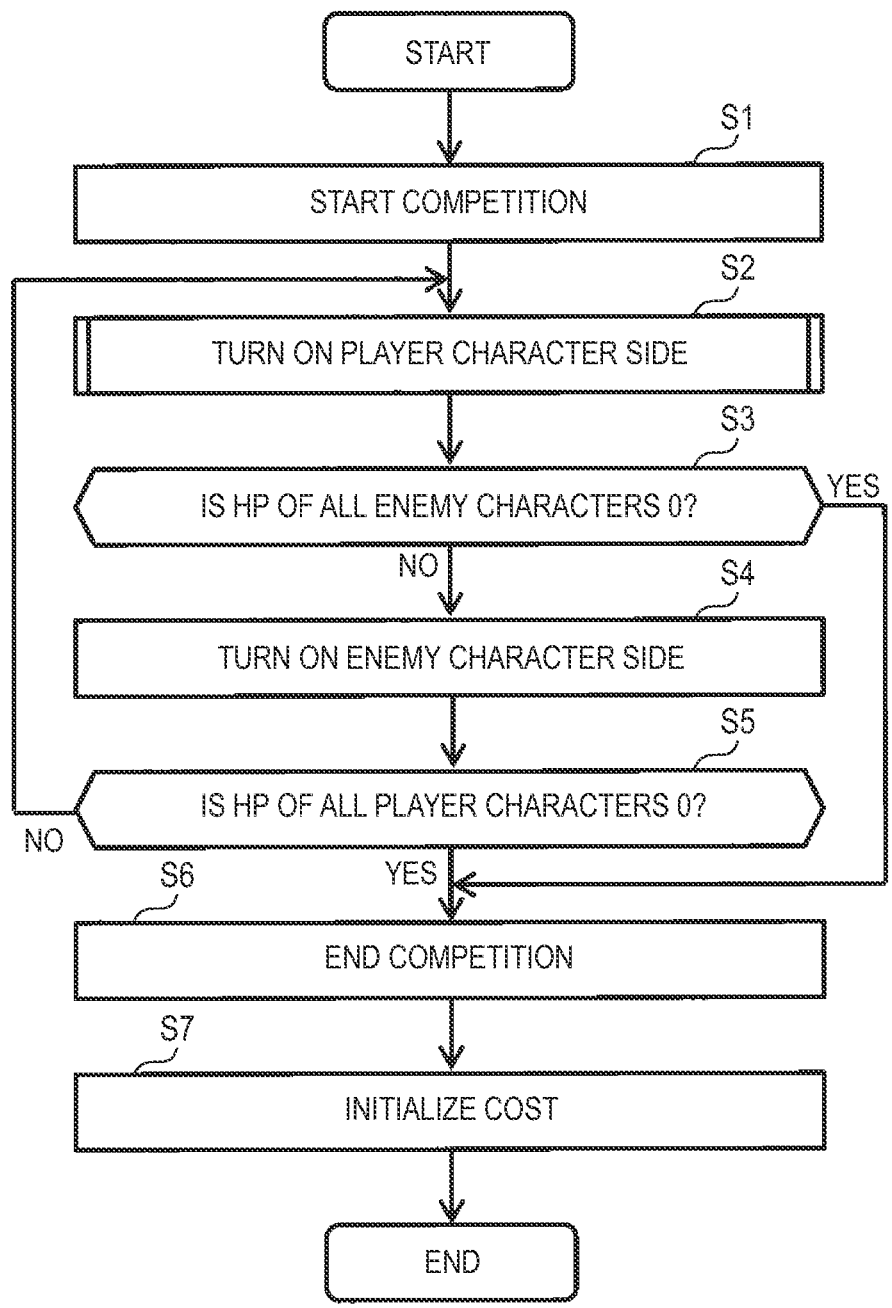
FIG. 7 is a flowchart illustrating an example of a processing operation of the terminal device 100 according to one embodiment.

FIG. 7 is a flowchart illustrating an example of a processing operation of the terminal device 100 according to one embodiment. Hereinafter, an example will be described in which the terminal device 100 illustrated in FIG. 4 executes the game described above by using FIG. 1 to FIG. 3.

Note that, the character control unit 41 configures the deck in advance and configures the unit from five player characters among the player characters included in the deck. Further, the character control unit 41 sets three player characters of the five player characters to the vanguard character, and the other two player characters to the rearguard character. Note that, the spirit character can be included in the deck, but is not included in the unit.

The game progress control unit 48 allows the competition to start at a predetermined timing, and displays the competition screen as illustrated in FIG. 1 on the display 1 (step S1). When the competition starts, the game progress control unit 48 sets the energy point of each of the player characters, and the spirit point and the skill point common to three player characters to a predetermined initial value. Then, the game progress control unit 48 executes the turn on the player character side (step S2).

Figure 8:
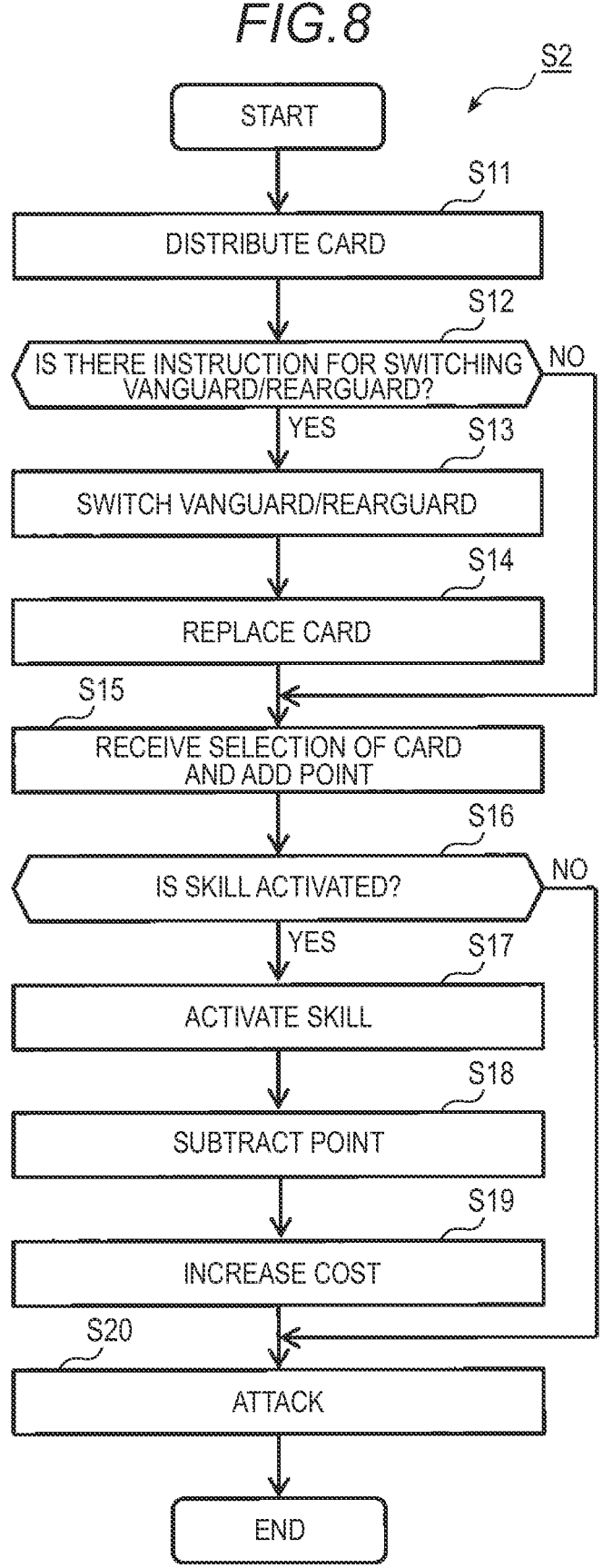
FIG. 8 is a flowchart illustrating an example of the processing operation of the terminal device 100 in a turn on the player character side.

FIG. 8 is a flowchart illustrating an example of the processing operation of the terminal device 100 in the turn on the player character side.

When the turn starts, the card distribution unit 42 distributes six cards from the card bundle prepared in the stock to the player card (step S11). The card distribution unit 42 sets one of the six cards as a card seen at the top of the card bundle, and the other five cards are set to a randomly selected card. In addition, the card distribution unit 42 distributes six cards, and then, sets one card that is randomly selected at the top of the stock. The card is distributed when the next turn starts.

The character (any of three vanguard characters) and the type (any of the "energy", the "spirit", and the "skill") are set for the card. Note that, in a case where the energy point reaches a predetermined value in the previous turn, the card distribution unit 42 distributes at least one killer technique card for which the character and the type are not set.

In each of the turns, the player is capable of switching the vanguard character and the rearguard character. In a case where the player performs a manipulation for switching (YES in step S12), the character control unit 41 sets the player character selected by the player among the vanguard characters in the rearguard, and sets the player character selected by the player among the rearguard characters in the vanguard (step S13).

The card distribution unit 42 replaces the card in accordance with the switching between the vanguard character and the rearguard character (step S14). Specifically, the card distribution unit 42 replaces at least a card for which the player character switched to be in the rearguard is set, among the six cards distributed to the player card, with a card for which the player character newly set in the vanguard is set.

The player is capable of selecting one card or a plurality of cards of which the set characters or the set types are common, among the six cards distributed to the player card (here, the killer technique card can be selected along with an arbitrary card). That is, the game progress control unit 48 receives the selection of the card through the manipulation from the player. Then, the point addition unit 43 adds the point in accordance with the selected card (step S15).

For example, in a case where the energy card is selected, the point addition unit 43 increases the energy point of the vanguard character set for the energy card. In this case, the point addition unit 43 may increase the spirit point and the skill point.

In a case where the spirit card is selected, the point addition unit 43 increases the spirit point. In this case, the point addition unit 43 may increase the energy point and the skill point of each of the player characters.

In a case where the skill card is selected, the point addition unit 43 increases the skill point. In this case, the point addition unit 43 may increase the energy point and the spirit point of each of the player characters.

Here, in a case where the current value of the skill point is greater than or equal to the current value of the cost of the skill that the vanguard character possesses, the skill can be activated. The skill activation unit 44 receives the activation instruction of the skill from the player, and displays the skill selection screen on the display 1. Then, in a case where the activation of the skill is instructed by the manipulation from the player, that is, the skill to be activated is designated, (YES in step S16), the skill activation unit 44 activates the skill such that the effect according to the skill is exhibited (step S17). As a specific example, the skill activation unit 44 allows a parameter corresponding to the effect of the activated skill (the capacity parameter of the player character, the state parameter of the enemy character, and the like) to vary.

Then, the point subtraction unit 45 subtracts the current value of the cost of the activated skill from the current value of the skill point to be a new current value of the skill point (step S18).

In addition, the cost increase unit 46 increases the cost of the activated skill (step S19). Specifically, the cost increase unit 46 adds the increase value to the current value of the cost of the activated skill to be a new current value of the cost, with reference to the storage unit 3 (FIG. 6). Here, in a case where the cost after the addition is greater than the upper limit value, the cost increase unit 46 increases the current value of the cost up to the upper limit value.

A specific example of steps S16 to S18 will be described by using FIG. 6. In a case where the current value of the skill point is 25, a skill K11 of which the initial value of the cost is 10 and a skill K12 of which the initial value of the cost is 20 can be activated. Accordingly, in an exemplary embodiment, the server (and/or the terminal) may cause the skill selection screen as illustrated in FIG. 2 on which the skills K11 and K12 can be selected to be displayed on the display 1. In a case where the player selects the skill K11, the skill K11 is activated, and the hit point of the enemy character decreases by 20. Then, the current value of the cost of the skill K11 increases by the increase value of 30, and a new cost of the skill K11 is 40. Accordingly, the information of the skill stored in the storage unit 3 is updated to a state illustrated in FIG. 9 from a state illustrated in FIG. 6.

Returning to FIG. 8, the game progress control unit 48 allows the player character set for the selected card to attack the enemy character, and reduces the hit point of the enemy character (step S20).

In addition, in a case where the selected card includes the killer technique card, the game progress control unit 48 activates the killer technique, and greatly reduces the hit point of the enemy character, compared to the general attack.

In addition, in a case where the spirit point reaches a predetermined value, the game progress control unit 48 activates spirit skill that the spirit character included in the deck possesses such that a predetermined effect is exhibited, in accordance with the manipulation from the player. For example, in a case where the spirit skill for decreasing the cost of the skill is activated, the cost decrease unit 47 decreases the current value of the cost of the skill that the player character possesses. The cost decrease target skill may be associated with the spirit skill to be activated, or may be designated by the manipulation of the player.

Note that, the order of the activation of the skill (steps S16 to S19), the attack (step S20), the activation of the killer technique, and the activation of the spirit skill is arbitrary, and may be suitably switched.

In addition, in a case where the killer technique is activated, the cost increase unit 46 may increase the energy point required for activating the same killer technique, and it is desirable that the energy point is not increased. This is because the killer technique is associated with a specific player character, and unlike the skill, there is no choice for the player (simply, it is difficult to activate). According to the same reason, in a case where the spirit skill is activated, the cost increase unit 46 may increase the spirit point required for activating the same spirit skill, and it is desirable that the spirit point is not increased.

As described above, the turn on the player character side ends.

Returning to FIG. 7, the hit points of all of the enemy characters are 0 by the attack in the turn on the player character side (YES in step S3), the game progress control unit 48 ends the competition as a victory on the player character side (step S6).

On the other hand, in a case where the hit point of at least one enemy character is not 0 (NO in step S3), the game progress control unit 48 executes the turn on the enemy character side (step S4).

In the turn on the enemy character side, the hit point of the player character can be reduced by the attack of the enemy character. Only the vanguard character of the player characters is attacked in the turn on the enemy character side. In a case where the hit point of the player character is 0 by the attack, the character control unit 41 sets the player character that is designated by the manipulation from the player or randomly selected, among the rearguard characters, in the vanguard.

In this case, the game progress control unit 48 may increase the energy point of the other character (for example, the other existing character, the other existing vanguard character and/or a character newly set in the vanguard) in accordance with the energy point of the vanguard character of which the hit point is 0. Specifically, the game progress control unit 48 may allocate the energy point of the vanguard character of which the hit point is 0 to the other character.

In a case where there are a plurality of characters to be an allocation target, there are various ways to allocate the energy points of each of the characters. For example, the energy points may be evenly divided in accordance with the number of characters to be the allocation target. Alternatively, the energy points may be allocated in accordance with the current values of the energy points of the characters to be the allocation target, and more specifically, more (or less) energy points may be allocated to a character of which the current value of the energy point is large, or an energy point according to (for example, proportional to) a difference between a predetermined value and the current value of the energy point may be allocated. In addition, in a case where there is a character of which the energy point is greater than the upper limit value by the allocation of the energy point, the exceeded energy point and the energy point to be allocated to the other character may be added and evenly divided by the number of the other characters to be allocated again.

In a case where the hit points of all of the player characters included in the unit are 0 by the attack in the turn on the enemy character side (YES in step S5), the game progress control unit 48 ends the competition as a victory on the enemy character side (step S6).

On the other hand, in a case where the hit point of at least one player character is not 0 (NO in step S5), the game progress control unit 48 executes again the turn on the player character side (step S2). Hereinafter, the turn on the player character side and the turn on the enemy character side are repeated until the hit points of all of the enemy characters are 0 or the hit points of all of the player characters are 0 (steps S2 to S5).

In a case where the competition ends (step S6), the cost decrease unit 47 decreases the cost of the skill of which the cost is increased by the cost increase unit 46 up to the initial value (step S7). Accordingly, the next competition is provided in a state where the cost of each of the skills is the initial value. For example, the information of the skill stored in the storage unit 3 is updated (initialized) to the state illustrated in FIG. 6 from the state illustrated in FIG. 9.

As described above, in this embodiment, in a case where the skill activated, the cost for activating the same skill next time increases. Therefore, the efficiency of the skill decreases, and the player is less likely to use the same skill. Accordingly, the player is motivated to activate the other skill. As a result thereof, the player activates various skills, and thus, the amusement of the game is improved.

Hereinafter, some modification examples of the game will be described.

As a first modification example, in a case where the vanguard character is switched to be in the rearguard in the middle of the turn, in addition to or instead of when the skill is activated, the cost increase unit 46 may increase the cost of the skill that the player character possesses. In this case, it is desirable that some merits are given to the player in exchange for a demerit of increasing the cost. For example, a merit can be considered in which the point addition unit 43 adds the energy point of the rearguard character in each turn.

According to such a configuration, since the cost of the skill of the character that is continuously in the vanguard does not increase (or the increase amount is relatively small), the skill is more likely to be used. On the other hand, since the cost of the skill of the character set in the rearguard increases, the skill is less likely to be used, and the character is not capable of participating in the competition, but since the energy point increases (by being set again in the vanguard), the killer technique is more likely to be used. Accordingly, a strategy of switching the vanguard and the rearguard in accordance with the situation of the competition while considering whether to give importance to the skills of each of the player character or the killer technique is required, and thus, the amusement is improved.

As a second modification example, in a case where the vanguard character is switched to be in the rearguard in the middle of the turn, in addition to/instead of when the competition with the enemy character ends, the cost decrease unit 47 may decrease the cost of the skill that the player character possesses.

According to such a configuration, the player is capable of actively switching the vanguard and the rearguard, and a number of characters are used as the vanguard, and thus, the amusement is improved. Note that, in such a case, it may not be necessary to set the maximum value of the cost. This is because in a case where the cost of the skill that the character possesses increases, and the skill is less likely to be activated, the cost can be easily decreased by setting the player character in the rearguard.

As a third modification example, in a case where the skill is not activated in one turn or a plurality of turns, in addition to or instead of when the competition with the enemy character ends, the cost decrease unit 47 may decrease the cost of the skill. As a more specific example, for a certain skill, the cost increase unit 46 may multiply the cost a predetermined-fold (for example, twofold) every time when the skill is activated once, but the cost decrease unit 47 may decrease the cost only by a predetermined value (for example, 10 points) in a turn in which the skill is not activated.

According to such a configuration, it is necessary to expect the next action of the enemy character and to consider the cost of the skill at each timing in order to determine which skill is effective to be activated at which timing, and thus, the amusement of the game is improved.

As a fourth modification example, the same cost as the skill may be set for the killer technique after the energy point is lost. In a case where the current value of the skill point is greater than or equal to the current value of the cost of the killer technique, the skill activation unit 44 activates the killer technique possessed by the vanguard character selected in accordance with the manipulation of the player. Then, in a case where the killer technique is activated, the cost increase unit 46 increases the cost of the skill possessed by the vanguard character that activates the killer technique. On the other hand, in a case where the skill is activated, the cost activation unit increases the cost of the killer technique possessed by the vanguard character that activates the skill.

According to such a configuration, it is necessary to consider role allotment between the player character mainly activating the skill and the player character mainly activating the killer technique, and thus, the amusement of the game is improved.

Figure 10:
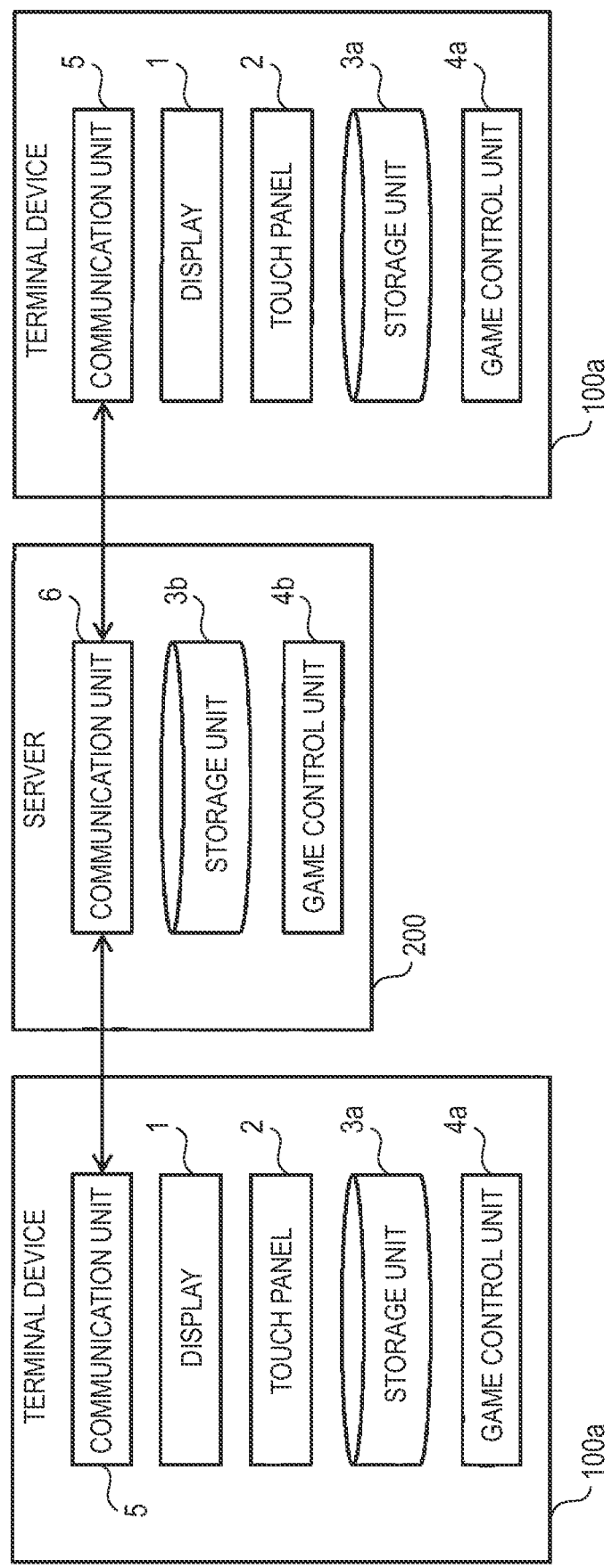
FIG. 10 is a block diagram illustrating an outline configuration of a game system according to another embodiment.

Note that, in FIG. 4, the game control unit 4 is provided in the terminal device 100, and the terminal device 100 mainly performs each processing. In contrast, as illustrated in FIG. 10, a game system in which a terminal device 100a and a server 200 cooperate with each other may provide a game.

Specifically, the terminal device 100a includes a communication unit 5, and communicates with the server 200. The type of communication is not particularly limited. Further, the terminal device 100a includes the display 1, the touch panel 2, a storage unit 3a, and a game control unit 4a.

In addition, the server 200 includes a communication unit 6, a storage unit 3b, and a game control unit 4b. The communication unit 6 communicates with the terminal device 100a. According to an exemplary embodiment, a part of or all the game control unit 4 may be attained by a processor (not illustrated) of the server 200 executing a game program stored in the storage unit 3b. For example, according to an exemplary embodiment, the control unit can be configured as a circuit that includes one or more processors that operate according to a computer program (software), one or more dedicated hardware circuits that perform at least some of the various processes, or a combination thereof. In an exemplary embodiment, the one or more processors may include an arithmetic processing unit such as a CPU, MPU, or GPU, and a storage medium such as RAM or ROM. The control unit may also have a memory storage medium or memory, such as an HDD, SSD, or the like. It may be contemplated for at least one of these storage media to store instructions, such as program code, configured to cause the CPU to perform processing. The storage medium, or computer readable medium, may include any available medium that can be accessed by a general purpose or dedicated computer.

Each of the storage units 3a and 3b is capable of storing a part of or all the information and the like described as those stored in the storage unit 3a of FIG. 4. The game control units 4a and 4b execute a part of or all the processing operation described as that performed by each unit in the game control unit 4 of FIG. 4.

Then, as necessary, the game control units 4a and 4b may cooperate with each other to perform each processing described above with each other with reference to the storage unit 3a and/or storage unit 3b.

According to an aspect as illustrated in FIG. 10, a so-called cooperative battle is also available in which one player and the other player cooperate with each other to compete with the enemy character.

In the cooperative battle, in a case where the cost of a skill that a player character of one player possesses is increased, the game control units 4a and 4b may increase the cost of a skill of the same system that a player character of the other player possesses. The system of the skill is set in advance for the skill, and is a group of skills with the common or corresponding effect, such as a skill for increasing the offensive strength of the player character and a skill for increasing the defensive strength of the player character. It can also be said that the skills of the same system are skills associated with each other in advance.

In addition, in a case where the cost of the skill that the player character of one player possesses is decreased, the game control units 4a and 4b may decrease the cost of the skill of the same system that the player character of the other player possesses. A specific method or a specific timing for an increase and a decrease is as described above.

As described above, a sense of togetherness between the players cooperating with each other increases.

In addition, according to the aspect as illustrated in FIG. 10, a competition battle is also available in which one player and the other player compete with each other. In this case, the enemy character described above is replaced with the player character of the other player.

In such a competition battle, in a case where the cost of the skill that the player character of the player possesses is increased, the game control units 4a and 4b may increase the cost of the skill that the player character of an opponent player possesses. An increase amount may be common, an increase amount on the player side may be large, or an increase amount on the opponent side may be large. Alternatively, in a case where the player activates the skill, only the cost on the opponent side may be increased without increasing the cost on the player side.

Note that, in each of the examples described above, the character or the card is used, but an arbitrary game content such as an avatar or an item may be used in addition to the character or the card. The game content may be electronic data that can be acquired, purchased, possessed, used, managed, replaced, synthesized, enhanced, sold, discarded and/or donated by the player.

The program described herein may be distributed by being non-transitorily recorded in a computer-readable recording medium, may be distributed through a communication line (also including wireless communication) such as the internet, or may be distributed in a state of being installed in an arbitrary device.

Each invention described herein is not limited to each of the embodiments described above, but can be suitably subjected to various additions, changes, combinations, and partial deletions. For example, herein, one device described above (including that depicted as one device in the drawings) may be attained by a plurality of devices. On the contrary, herein, a plurality of devices described above (including those depicted as a plurality of devices in the drawings) may be attained by one device. Alternatively, a part or all the means or the function included in one device (for example server) may be included in the other device (for example, the user terminal).

In addition, a part of a certain embodiment may be incorporated in the other embodiment insofar as there is no contradiction. Further, not all of the matters described herein are requirements. In particular, the matters described in herein and not described in the claims are arbitrary additional matters.

Note that, the present applicant merely knows the known invention described in the document in the column of "Prior Art Document" herein, and an object of the invention described herein is not necessarily to solve the problems in the known invention in the same document. The problem to be solved by the invention described in the claims should be recognized in consideration of the entire specification. For example, herein, in a case where a predetermined effect is obtained by a specific configuration (including not only a case where there is explicit description but also a case where it can be read from the configuration), it can also be said that the problem to be a reverse side of the predetermined effect is solved. However, it does not necessarily intend that such a specific configuration is the requirement of the invention.

REFERENCE SIGNS LIST 100, 100a terminal device
200 server
1 display
2 touch panel
3, 3a, 3b storage unit
4, 4a, 4b game control unit
5, 6 communication unit
41 character control unit
42 card distribution unit 43 point addition unit
44 skill activation unit
45 point subtraction unit
46 cost increase unit
47 cost decrease unit
48 game progress control unit
80a to 80c vanguard character
81 enemy character
82a to 82c energy gauge
83 spirit gauge
84 skill gauge
85 card bundle
86a to 86f card
87 spirit skill activation button
88 skill activation button

The invention claimed is:

1. A non-transitory computer-readable medium containing game control program code for controlling a game in which a cost is set for each of a plurality of skills, wherein the game control program code is configured to control a computer to provide:
   a skill activation circuit configured to activate a first skill of the plurality of skills in response to receipt, from a player, of an activation instruction of the first skill, the first skill having a set cost that is less than or equal to a number of points to be used in skill activation;
   a point subtraction circuit configured to subtract a point value corresponding to the cost which is set for the first skill from the number of points to be used in skill activation, in response to activation of the first skill; and
   a cost increase circuit configured to increase the cost which is set for the first skill in response to the activation of the first skill;
   wherein an upper limit value that is common to all of the plurality of skills is set for the cost, and
   the cost increase circuit is configured to, upon activation of the skill, determine whether the skill is at the upper limit value or below the upper limit value, wherein the cost increase circuit is configured to increase the cost up to the upper limit value in a case where the skill is below the upper limit value and is configured to prevent a further increase of the cost when the skill is at the upper limit value.

2. The non-transitory computer-readable medium according to claim 1, further comprising instructions configured to control the computer to provide:
   a cost decrease circuit configured to decrease the cost which is set for the first skill.

3. The non-transitory computer-readable medium according to claim 2,
   wherein the cost decrease circuit is configured to decrease the cost which is set for the first skill up to an initial value of the cost of the first skill.

4. The non-transitory computer-readable medium according to claim 3,
   wherein the cost decrease circuit is configured to decrease the cost which is set for the first skill by a predetermined value.

5. The non-transitory computer-readable medium according to claim 2,
   wherein the game includes a competition with an enemy game content, and
   the cost decrease circuit is configured to decrease the cost which is set for the first skill in accordance with a start or an end of the competition with the enemy game content.

6. The non-transitory computer-readable medium according to claim 2,
   wherein a second skill of the plurality of skills has an effect of decreasing a cost of a skill having a cost that has been increased from a base value, and
   the cost decrease circuit is configured to decrease the cost which is set for the first skill based on activation of the second skill.

7. The non-transitory computer-readable medium according to claim 2,
   wherein the game includes a competition with an enemy game content, and
   the non-transitory computer-readable medium is further configured to control the computer to provide:
   a game content control circuit configured to set a portion of a plurality of player game contents possessed by the player to be engaged in the competition with the enemy game content and a remaining portion of the plurality of player game contents to be unengaged in the competition with the enemy game content in accordance with a manipulation of the player, and
   the cost decrease circuit is configured to decrease the cost which is set for the first skill in accordance with a change in state of the player game content between a state where the player game content is engaged in the competition and has activated the first skill to a state where the player game content is unengaged in the competition during the competition with the enemy game content.

8. The non-transitory computer-readable medium according to claim 2,
   wherein the game is a turn-based game, and
   the cost decrease circuit is configured to decrease the cost which is set for the first skill in accordance with a predetermined number of turns and a fact that the first skill is not activated.

9. The non-transitory computer-readable medium according to claim 1,
   wherein an increase value of a cost to be increased by the cost increase circuit in response to one skill activation is common to all of the plurality of skills.

10. The non-transitory computer-readable medium according to claim 1,
    wherein an increase value of a cost to be increased by the cost increase circuit in response to one skill activation is different between the first skill and a third skill of the plurality of skills.

11. The non-transitory computer-readable medium according to claim 1, wherein the non-transitory computer-readable medium is further configured to control the computer to provide:
    a point addition circuit configured to add points to the number of points to be used in skill activation,
    wherein the upper limit value of the cost is a maximum value or less of the number of points to be used in skill activation.

12. The non-transitory computer-readable medium according to claim 1, wherein the non-transitory computer-readable medium is further configured to control the computer to provide:
    a point addition circuit configured to add points to the number of points to be used in skill activation; and
    a game content distribution circuit configured to distribute a plurality of point increase game contents, wherein the point addition circuit is configured to add points in accordance with a number of point increase game contents selected by the player among the point increase game contents.

13. The non-transitory computer-readable medium according to claim 12,
wherein in the game, a competition between the player game content and the enemy game content is performed on the basis of a turn,
wherein the non-transitory computer-readable medium is further configured to control the computer to provide:
a game content control circuit configured to set two or more of the player game contents possessed by the player to be engaged in the competition with the enemy game content,
wherein the game content control circuit is configured to receive and execute a selection, from the plurality of point increase game contents, of any one of the player game contents to be engaged in the competition with the enemy game content, and
wherein the game content control circuit is configured to receive and execute a second selection, from the plurality of point increase game contents, of a further one or more of the player game contents only in a case where the any one of the player game contents and the further one or more of the player game contents include a common feature.

14. A game control method for controlling a game in which a cost is set for each of a plurality of skills, the method comprising:
allowing a skill activation circuit to activate a first skill of the plurality of skills in response to receipt, from a player, of an activation instruction of the first skill, the first skill having a set cost that is less than or equal to a number of points to be used in skill activation;
allowing a point subtraction circuit to subtract a point value corresponding to the cost which is set for the first skill from the number of points to be used in skill activation, in response to activation of the first skill;
allowing a cost increase circuit to increase the cost which is set for the first skill in response to the activation of the first skill;
wherein an upper limit value that is common to all of the plurality of skills is set for the cost; and
allowing the cost increase circuit to, upon activation of the skill, determine whether the skill is at the upper limit value or below the upper limit value, and allowing the cost increase circuit to increase the cost up to the upper limit value in a case where the skill is below the upper limit value and allowing the cost increase circuit to prevent a further increase of the cost when the skill is at the upper limit value.

15. A game control system for controlling a game in which a cost is set for each of a plurality of skills, the system comprising:
a skill activation circuit configured to activate a first skill of the plurality of skills in response to receipt, from a player, of an activation instruction of the first skill, the first skill having a set cost that is less than or equal to a number of points to be used in skill activation;
a point subtraction circuit configured to subtract a point value corresponding to the cost which is set for the first skill from the number of points to be used in skill activation, in response to activation of the first skill; and
a cost increase circuit configured to increase the cost which is set for the first skill in response to the activation of the first skill, wherein an upper limit value that is common to all of the plurality of skills is set for the cost; and
wherein the cost increase circuit is further configured to, upon activation of the skill, determine whether the skill is at the upper limit value or below the upper limit value, wherein the cost increase circuit is configured to increase the cost up to the upper limit value in a case where the skill is below the upper limit value and is configured to prevent a further increase of the cost when the skill is at the upper limit value.

* * * * *